United States Patent
Miller et al.

(10) Patent No.: US 8,557,884 B2
(45) Date of Patent: Oct. 15, 2013

(54) TO ENHANCE THE THERMAL INSULATION OF POLYMERIC FOAM BY REDUCING CELL ANISOTROPIC RATIO AND THE METHOD FOR PRODUCTION THEREOF

(75) Inventors: Larry M. Miller, Tallmadge, OH (US); Raymond M. Breindel, Hartville, OH (US); Mitchell Z. Weekley, Tallmadge, OH (US); Thomas E. Cisar, Cuyahoga Falls, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 909 days.

(21) Appl. No.: 11/584,688

(22) Filed: Oct. 20, 2006

(65) Prior Publication Data

US 2007/0179206 A1 Aug. 2, 2007
US 2009/0054541 A9 Feb. 26, 2009

Related U.S. Application Data

(63) Continuation-in-part of application No. 11/517,748, filed on Sep. 8, 2006, which is a continuation-in-part of application No. 10/160,817, filed on May 31, 2002, now abandoned.

(51) Int. Cl.
C09J 9/00 (2006.01)

(52) U.S. Cl.
USPC ................. 521/79; 521/94; 521/97; 521/146; 521/149; 264/46.1; 264/531

(58) Field of Classification Search
USPC ........ 521/79, 94, 97, 146, 149; 264/46.1, 531
See application file for complete search history.

(56) References Cited

U.S. PATENT DOCUMENTS

| | | | |
|---|---|---|---|
| 1,990,434 A | 2/1935 | Kohler | |
| 2,083,557 A | 6/1937 | Crane et al. | |
| 2,191,658 A | 2/1940 | Haux | |
| 2,256,483 A | 9/1941 | Johnston | |
| 2,987,768 A | 6/1961 | Given | |
| 3,295,163 A | 1/1967 | Bachus | |
| 3,378,887 A | 4/1968 | Reib et al. | |
| 3,428,726 A | 2/1969 | Moss | |
| 3,431,164 A | 3/1969 | Gilbert | |
| 3,492,249 A | 1/1970 | Pezarro et al. | |
| 3,558,753 A | 1/1971 | Ban | |
| 3,584,108 A | 6/1971 | Nelson et al. | |
| 3,704,083 A | 11/1972 | Phipps | |
| 3,751,377 A | 8/1973 | Buckner | |
| 3,813,200 A | 5/1974 | Gergely | |
| 3,822,331 A | 7/1974 | Cogliano | |
| 3,912,436 A | 10/1975 | Bailly | |
| 4,000,402 A | 12/1976 | Higham | |
| 4,039,362 A * | 8/1977 | Ernstsson et al. | 156/69 |
| 4,044,084 A | 8/1977 | Phipps | |
| 4,199,310 A | 4/1980 | Phipps | |
| 4,211,739 A | 7/1980 | Phipps | |
| 4,229,392 A | 10/1980 | Shimano et al. | |
| 4,234,529 A | 11/1980 | Phipps | |
| 4,244,897 A | 1/1981 | Moon | |
| 4,247,276 A | 1/1981 | Phipps | |
| 4,271,107 A | 6/1981 | Phipps | |
| 4,324,493 A | 4/1982 | Colombo | |
| 4,359,160 A | 11/1982 | Myers et al. | |
| 4,371,488 A | 2/1983 | Phipps et al. | |
| 4,395,214 A | 7/1983 | Phipps et al. | |
| 4,428,896 A | 1/1984 | Stevenson | |
| 4,436,679 A | 3/1984 | Winstead | |
| 4,445,837 A | 5/1984 | Cisar et al. | |
| 4,454,082 A | 6/1984 | Cisar et al. | |
| 4,454,087 A | 6/1984 | Hayashi et al. | |
| 4,469,652 A | 9/1984 | Cisar et al. | |
| 4,486,369 A | 12/1984 | Schafler et al. | |
| 4,487,731 A | 12/1984 | Kobayashi | |
| 4,510,268 A | 4/1985 | Tonokawa et al. | |
| 4,554,293 A * | 11/1985 | Park | 521/81 |
| 4,556,369 A | 12/1985 | Braun | |
| 4,585,603 A | 4/1986 | Futura et al. | |
| 4,626,183 A | 12/1986 | Shirai et al. | |
| 4,689,355 A | 8/1987 | Treptow et al. | |
| 4,746,478 A | 5/1988 | Fujisaki et al. | |
| 4,783,291 A | 11/1988 | Pagan | |

(Continued)

FOREIGN PATENT DOCUMENTS

| CA | 2091952 | 9/1997 |
|---|---|---|
| EP | 72740 | 2/1983 |

(Continued)

OTHER PUBLICATIONS

The thermal conductivity of foamed plastics, Richard E. Skochdopole, Chemical Engineering Progress, vol. 57, No. 10, Oct. 1961.
Prediction of the radation term in the thermal conductivity of crosslinked closed cell polyolefin foams, Journal of Polymer Science, vol. 38, 2000.
Office action from U.S. Appl. No. 10/739,360 dated Apr. 12, 2006.
Notice of Allowance from U.S. Appl. No. 10/739,360 dated Aug. 8, 2006.
International Search Report from PCT/US97/14055 dated Feb. 6, 1998.
International Search Report from PCT/US98/16400 dated Dec. 22, 1998.

(Continued)

Primary Examiner — Irina S Zemel
(74) Attorney, Agent, or Firm — Calfee, Halter & Griswold LLP (57) ABSTRACT

This invention relates to foam insulating products, particularly extruded polystyrene foam, with increasing the cell orientation and reducing cell anisotropic ratio, as well as the process method for making the products thereof for improving the insulating properties and for reducing the manufacturing cost of the foam products. Alternatively, foam insulating products having increased cell compressive strength may be made by decreasing the cell orientation and increasing the cell anisotropic ratio.

20 Claims, 3 Drawing Sheets

(56) References Cited

U.S. PATENT DOCUMENTS

| | | | |
|---|---|---|---|
| 4,966,540 | A | 10/1990 | Taguchi et al. |
| 4,980,101 | A | 12/1990 | Beck et al. |
| 5,120,481 | A | 6/1992 | Brackman et al. |
| 5,176,925 | A | 1/1993 | Weber et al. |
| 5,236,325 | A | 8/1993 | Groblacher et al. |
| 5,340,295 | A | 8/1994 | Preiato et al. |
| 5,346,379 | A | 9/1994 | Wolfl et al. |
| 5,356,944 | A | 10/1994 | Blythe et al. |
| 5,373,026 | A | 12/1994 | Bartz et al. |
| 5,416,129 | A | 5/1995 | Chaudhary et al. |
| 5,424,016 | A | 6/1995 | Kolosowski |
| 5,604,265 | A | 2/1997 | De Vos et al. |
| 5,670,102 | A | 9/1997 | Perman et al. |
| 5,674,916 | A | 10/1997 | Shmidt et al. |
| 5,676,893 | A | 10/1997 | Cree |
| 5,698,144 | A | 12/1997 | Wilkes et al. |
| 5,707,573 | A | 1/1998 | Biesenberger et al. |
| 5,753,161 | A | 5/1998 | Lightle et al. |
| 5,776,389 | A | 7/1998 | Chaudhary |
| 5,783,122 | A | 7/1998 | Sadinski |
| 5,817,705 | A | 10/1998 | Wilkes et al. |
| 5,863,960 | A | 1/1999 | Shmidt et al. |
| 5,900,311 | A | 5/1999 | Campanella et al. |
| 6,036,468 | A | 3/2000 | Sadinski |
| 6,071,580 | A | 6/2000 | Bland et al. |
| 6,093,350 | A | 7/2000 | Sadinski |
| 6,113,374 | A | 9/2000 | Brackman et al. |
| 6,116,882 | A | 9/2000 | Sadinski et al. |
| 6,213,752 | B1 | 4/2001 | Sadinski |
| 6,268,046 | B1 | 7/2001 | Miller et al. |
| 6,315,932 | B1 | 11/2001 | Fujiwara et al. |
| 6,403,016 | B1 | 6/2002 | Sadinski |
| 6,541,105 | B1 | 4/2003 | Park |
| 6,696,504 | B1 | 2/2004 | Hayashi et al. |
| 7,150,614 | B2 | 12/2006 | Sadinski |
| 2003/0225172 | A1 | 12/2003 | Miller et al. |
| 2005/0192368 | A1 | 9/2005 | Miller et al. |
| 2007/0142487 | A1 | 6/2007 | Miller et al. |

FOREIGN PATENT DOCUMENTS

| | | |
|---|---|---|
| EP | 0 260 948 | 3/1988 |
| EP | 260949 | 3/1988 |
| EP | 0 561 216 | 9/1993 |
| EP | 0 570 211 | 11/1993 |
| EP | 0 570 221 | 11/1993 |
| EP | 0 863 175 | 9/1998 |
| EP | 1024163 | 8/2000 |
| GB | 1335816 | 10/1973 |
| JP | 3-286827 | 12/1991 |
| JP | 4-28524 | 1/1992 |
| MX | 186509 | 10/1997 |
| WO | 98/06554 | 2/1998 |
| WO | WO 98/56430 | 12/1998 |
| WO | 99/08855 | 2/1999 |
| WO | 99/33626 | 7/1999 |
| WO | 99/33628 | 7/1999 |
| WO | WO 00/15697 | 3/2000 |
| WO | 00/23511 | 4/2000 |
| WO | WO 01/40362 | 6/2001 |
| WO | 03/102064 | 12/2003 |
| WO | 2005/061202 | 7/2005 |

OTHER PUBLICATIONS

International Search Report from PCT/US98/26890 dated Mar. 30, 1999.
International Search Report from PCT/US98/26892 dated Apr. 1, 1999.
International Search Report and Written Opinion from PCT/US04/42440 dated Mar. 31, 2005.
Office action from U.S. Appl. No. 08/999,167 dated Dec. 14, 1999.
Notice of Allowance from U.S. Appl. No. 08/999,167 dated May 9, 2000.
Notice of Allowance from U.S. Appl. No. 08/999,168 dated Jul. 14, 1999.
Office action from U.S. Appl. No. 09/470,918 dated Oct. 5, 2011.
Notice of Allowance from U.S. Appl. No. 09/470,918 dated Mar. 26, 2002.
Office action from U.S. Appl. No. 08/696,472 dated May 28, 1997.
Notice of Allowance from U.S. Appl. No. 08/696,472 dated May 28, 1997.
Notice of Allowance from U.S. Appl. No. 09/471,889 dated Oct. 24, 2000.
Office action from U.S. Appl. No. 08/999,168 dated Jan. 25, 1999.
Office action from U.S. Appl. No. 08/916,185 dated Nov. 10, 1998.
Office action from U.S. Appl. No. 08/916,185 dated Apr. 28, 1999.
Notice of Allowance from U.S. Appl. No. 08/916,185 dated Sep. 24, 1999.
Office action from U.S. Appl. No. 11/517,748 dated Jan. 13, 2012.
International Search Report from PCT/US03/14674 dated Jul. 7, 2004.
International Preliminary Examination Report from PCT/US03/14674 dated Oct. 22, 2004.
Office action from U.S. Appl. No. 10/887,006 dated Jul. 14, 2005.
Office action from U.S. Appl. No. 10/887,006 dated Jan. 20, 2006.
Advisory Action from U.S. Appl. No. 10/887,006 dated May 5, 2006.
Panel Decision from U.S. Appl. No. 10/887,006 dated Jul. 3, 2006.
Office action from U.S. Serial No, 11/517,748 dated Aug. 5, 2009.
Office action from U.S. Appl. No. 11/517,748 dated Mar. 17, 2010.
Office action from U.S. Appl. No. 11/517,748 dated Jan. 3, 2011.
Office action from U.S. Appl. No. 11/517,748 dated Aug. 10, 2011.
Office action from Australian Application No. 2003233528 dated Sep. 25, 2007.
Office action from Australian Application No, 2003233528 dated Oct. 23, 2008.
Office action from Canadian Application No. 2,486,159 dated Oct. 23, 2009.
Office action from Canadian Application No. 2,486,159 dated Jul. 8, 2010.
Office action from Chinese Application No. 03812548.X dated Jun. 9, 2006.
Office action from Chinese Application No. 200610089851,3 dated Mar. 28, 2008.
Office action from Chinese Application No. 200610089851.3 dated Jun. 20, 2008.
Communication from European Application No. 03728805.7 dated Apr. 10, 2008.
Communication from European Application No. 03728805.7 dated Oct. 24, 2008.
Communication from European Application No. 03728805.7 dated Jul. 17, 2009.
Summons for Oral Proceedings from European Application No. 03728805.7 dated Jul. 29, 2010.
Office action from Mexican Application No. 04/11922 dated 2009.
Office action from Mexican Application No. 04/11922 dated Nov. 1, 2010.
Office action from U.S. Appl. No. 10/160,817 dated Oct. 6, 2003.
Notice of Allowance from U.S. Appl. No. 10/160,817 dated May 3, 2004.
Office action from U.S. Appl. No. 10/160,817 dated Aug. 19, 2004.
Office action from U.S. Appl. No. 10/160,817 dated Apr. 12, 2005.
Office action from U.S. Appl. No. 10/160,817 dated Sep. 20, 2005.
Office action from U.S. Appl. No. 10/160,817 dated Mar. 9, 2006.
Notice of Abandonment from U.S. Appl. No. 10/160,817 dated Oct. 30, 2006.
Standard Specification for Rigid, Cellular Polystyrene Thermal Insulation, ASTM International, Designation: C 578-04a, pp. 1-7, 2004.
Office action from Mexican Application No. 02/11922 dated Oct. 31, 2011 with English explanation of relevant portions of action.
Interview Summary from U.S. Appl. No. 11/517,748 dated May 18, 2012.

* cited by examiner

TO ENHANCE THE THERMAL INSULATION OF POLYMERIC FOAM BY REDUCING CELL ANISOTROPIC RATIO AND THE METHOD FOR PRODUCTION THEREOF

CROSS-REFERENCE TO RELATED APPLICATIONS

This application is a continuation-in-part of U.S. application Ser. No. 11/517,748 entitled "To Enhance the Thermal Insulation of Polymeric Foam by Reducing Cell Anisotropic Ratio and the Method for Production Thereof" (filed on Sept. 8, 2006). U.S. application Ser. No. 11/517,748 is in turn a continuation-in-part of U.S. application Ser. No. 10/160,817 also entitled "To Enhance the Thermal Insulation of Polymeric Foam by Reducing Cell Anisotropic Ratio and the Method for Production Thereof" (filed on May 31, 2002, now abandoned.

TECHNICAL FIELD

The present invention relates to enhance the thermal insulation value (or to decrease the thermal conductivity) of rigid foamed polymeric boards by reducing cell anisotropic ratio and by increasing the cell orientation ratio, as well as the process methods for the production thereof. More particularly, it relates to rigid extruded polystyrene foam board wherein low cell anisotropic ratio or high cell orientation ratio is reached to increase thermal insulating value of the rigid foamed board.

BACKGROUND OF THE INVENTION

The usefulness of rigid foamed polymeric boards in a variety of applications is well known. Rigid foamed plastic boards are extensively used as thermal insulating materials for many applications. For instance, polymeric foam boards are widely used as insulating members in building construction. In the past, infrared attenuating agents have been used as fillers in polymeric foam boards to minimize material thermal conductivity k which, in turn, will maximize insulating capability (increase R-value) for a given thickness (U.S. Pat. Nos. 5,373,026 and 5,604,265; EP 863,175). The heat transfer k through an insulating material can occur through solid conductivity, gas conductivity, radiation, and convection. The heat transfer k, or K-factor, is defined as the ratio of the heat flow per unit cross-sectional to the temperature drop per unit thickness. In U.S. units, this is defined as:

$$\frac{Btu \cdot in}{Hr \cdot Ft^2 \cdot {}^\circ F.}$$

And the metric unit:

$$\frac{W}{mk}$$

In most polymeric foams of conventional cell size, i.e. 0.1 to 1.5 millimeters, the reduction of thermal conductivity k has been observed with decreasing the average cell size. This phenomenon is documented in "The Thermal Conductivity of Foamed Plastics," Chemical Engineering Progress, Vol. 57, No. 10, pp. 55-59, authored by Richard E. Skochdopol of The Dow Chemical Co., and "Prediction of the Radiation Term in the Thermal Conductivity of Crosslinked Closed Cell Polyolefin Foams," J. of Polymer Science: Part B: Polymer Physics, V 38, pp. 993-1004 (2000), by O. A. Almanza et al. of Universidad de Valladolid, which are herein incorporated by reference.

It is highly desirable to improve the thermal conductivity k without adding additives, or increasing the density and/or the thickness of foam product. Particularly, the architectural community desires a foam board having a thermal resistance value R equal to 10, with a thickness of less than 1-¾ inches, for cavity wall construction, to keep at least 1 inches of the cavity air gap clean. The total thermal resistance R, also known as the R-value, is the ratio of thickness t of the board to thermal conductivity k.

It is also highly desirable to produce the above rigid polymer foam having retained or improved compressive strength, thermal dimensional stability, fire resistance, and water absorption properties.

It is also highly desirable to provide the above rigid polymer foam with infrared attenuating agents and other process additives, such as nucleating agent, fire retardant, gas barrier, which has overall compound effects on foam properties including improved thermal conductivity (decreased k-factor), and improved insulating value (increased R-value) for a given thickness and density.

It is also highly desirable to provide the above rigid polymer foam with variety of blowing agents to enhance the thermal insulation R-value. These blowing agents include partially or fully hydrogenated chloroflourocarbons (HCFC's), hydroflourocarbons (HFC's), hydrocarbons (HC's), water, carbon dioxide, and other inert gases.

It is also highly desirable to provide the process methods and foaming facility modification to control the cell morphology: reduce the cell anisotropic and increase cell orientation during foaming process, for use in the production of a rigid polymer foam.

It is also highly desirable to lower the cost of a polymeric foam product in a simple and economical manner.

SUMMARY OF THE INVENTION

The present invention, in one preferred embodiment, relates to foam insulating products, such as extruded polystyrene foam, with low cell anisotropic ratio or higher cell orientation in the x/z direction to enhance the thermal insulation, and to retain other properties as well. The higher cell orientation can be achieved easily through process and die/shaper modification. The low anisotropic or higher cell orientation ratio polystyrene foams of the present invention decrease both the initial and the aged thermal conductivity, or inversely, increase the thermal resistance ("R value") as compared with substantially round cells.

In another preferred embodiment of the present invention, polymeric foams with a lower cell orientation ratio in the x/z direction and higher anistropic ratio can be achieved easily through process and die/shaper modification. Cells made in this way have improved compressive properties with only slight reductions in thermal conductivity and insulation R-values as compared with round cells.

The foregoing and other advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

DETAILED DESCRIPTION AND PREFERRED EMBODIMENTS OF THE INVENTION

Figure 1:
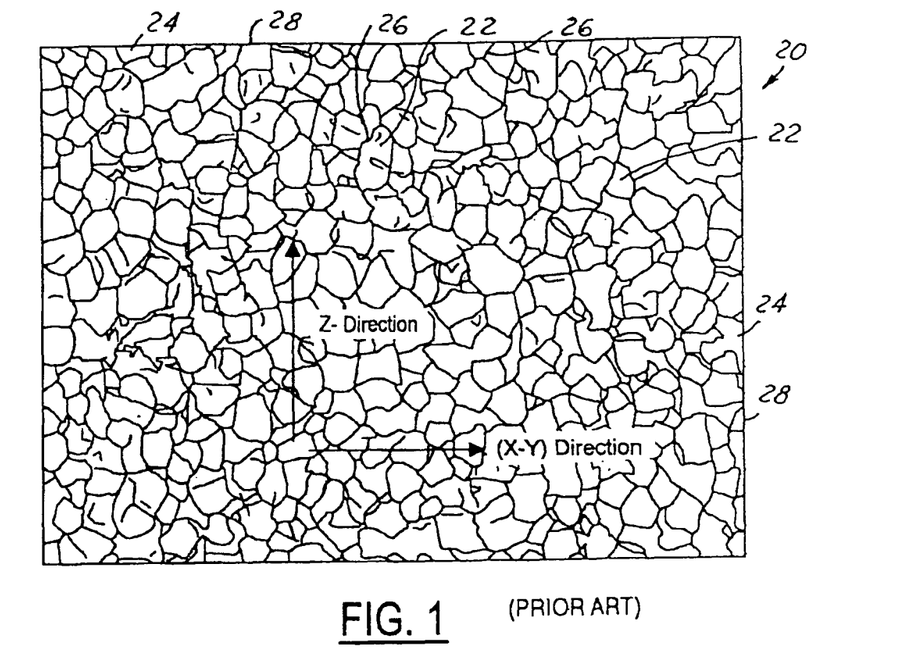
FIG. 1 illustrates a rigid, low-density foam made according to the prior art.
Figure 2:
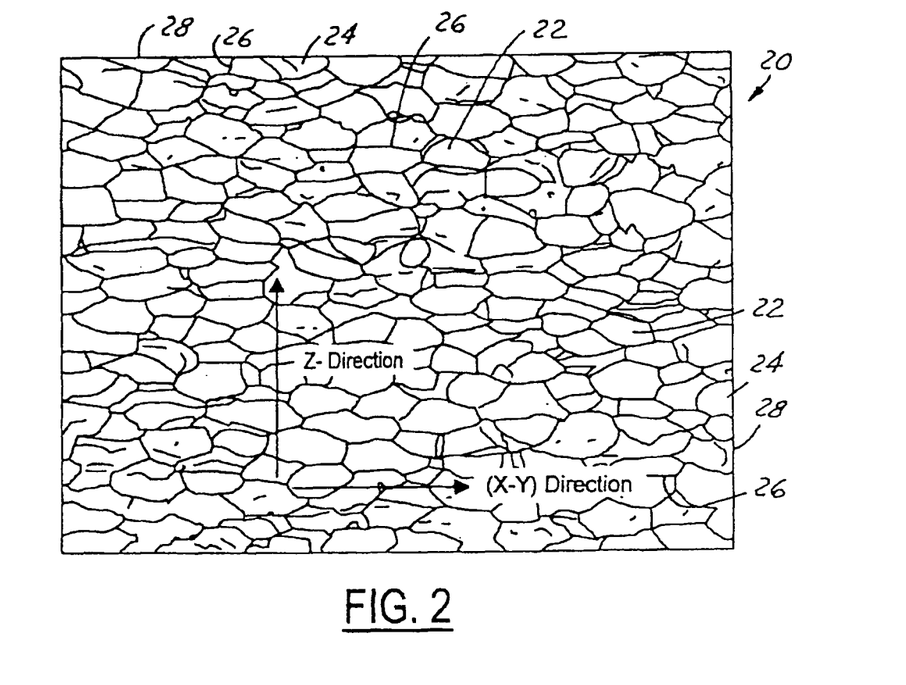
FIG. 2 illustrates a rigid, low-density foam made according to one preferred embodiment of the present invention.
Figure 3:
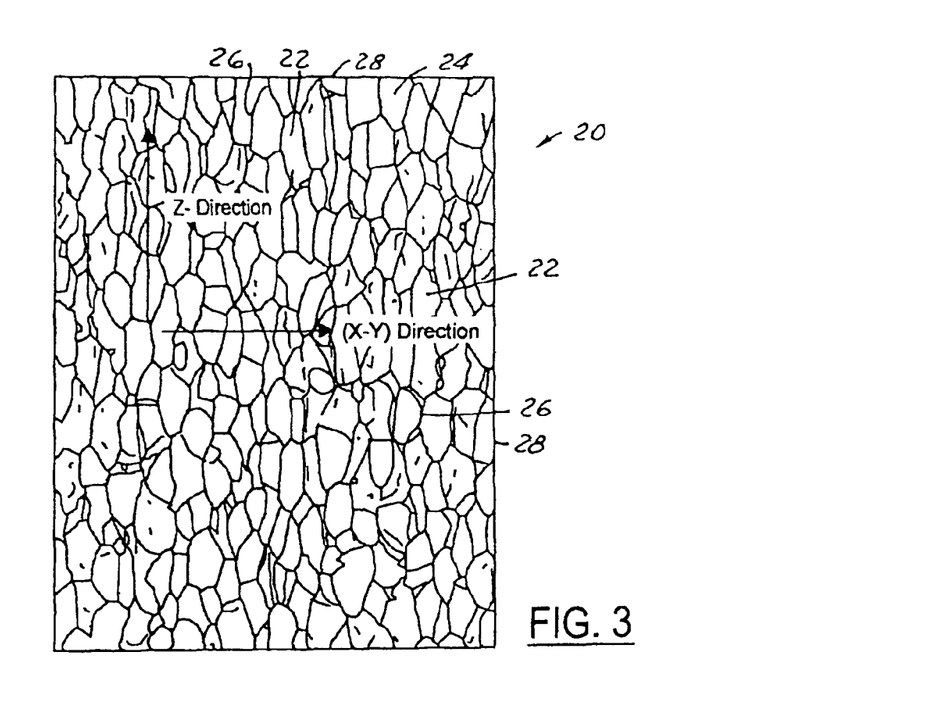
FIG. 3 illustrates a rigid, low-density foam made according to another preferred embodiment of the present invention.

The present invention relates to foam insulating products, such as extruded or expanded polystyrene foam, that are extensively used as thermal insulating materials for many applications. For instance, polymeric foam boards are widely used as insulating members in building construction. FIG. 1 illustrates a cross-sectional view of the rigid foam materials 20 made according to the prior art, while FIG. 2 illustrates the foam cells having enhanced thermal insulation values made in accordance with a preferred embodiment of the present invention. FIG. 3 illustrates another rigid foam material 20 made in accordance with a preferred embodiment of the present invention having improved compression strength.

Referring to FIG. 1, a rigid foam plastic material 20, typically a foam board, made according to the prior art is shown as having a plurality of interior open cells 22 and exterior open cells 24. Each interior open cell 22 is separated from the next corresponding interior open cell 22 and/or exterior open cell 24 by a cell strut 26, i.e. each open cell 22 shares a cell strut 26 with the next respective open cell 22. Similarly, each exterior open cell 24 is separated from the next corresponding exterior open cell 24 by a cell strut 26. Further, each exterior open cell 24 is separated from the outer environment surrounding the rigid foam plastic materials 20 by a cell wall 28. The thickness of the cell wall 28 is less than the thickness of a cell strut 26. The cells 22, 24 are substantially round in shape and have an average cell size of approximately 0.1 to about 1.5 millimeters in diameter. As the cells 22, 24 are substantially round, the x/z cell orientation ratio is approximately 1.0. The cell orientation ratio is simply a ratio of the cell size in the direction desired. For example, the cell orientation in the machine direction (or extruded direction) is defined as x/z cell orientation ratio and in the cross machine direction as y/z cell orientation ratio.

Further, the cell anisotropic ratio of substantially round cells as in the FIG. 1 is also approximately 1.0. Here, the cell anisotropic ratio a is determined as:

$$a = z/(xyz)^{1/3}$$

or, for easy calculation:

$$a = 10^{\lg z - 1/3 (\lg x \cdot y \cdot z)}$$

where x is the cell 22, 24 size of the foamed plastic material 20 in extruded direction; y is the cell 22, 24 size in the cross machine direction of the material 20; and z is the cell 22, 24 size in vertical thickness direction of the material 20. The cell sizes are measured by optical microscope or scanning electron microscope (SEM); which are observed at least two sliced faces—in the x/z plane and y/z plane, and are characterized by image analysis program. The average cell 22, 24 size, c is calculated by:

$$c = (x+y+z)/3$$

FIGS. 2 and 3 illustrate a rigid foam plastic material 20 made in accordance with the present invention in which the cell orientation ratio in the x/z direction is altered from about 1.0. As will be shown, the change in cell orientation ratio in the x/z direction results in new and unique properties for the rigid foam plastic materials 20.

FIG. 2 shows a rigid foam plastic material 20 having rigid foam cells 22, 24 made according to one preferred embodiment of the present invention. Here, the cell orientation ratio in the x/z direction is increased above 1.0 to between approximately 1.03 to about 2.0 while still maintaining a low cell anisotropic ratio between about 0.97 to about 0.6. Materials 20 made in accordance with FIG. 2 exhibit enhanced thermal insulation R-value, decreased thermal conductivity k, and decreased aged thermal conductivity without an increase in the amount of polymeric material per unit measure and without a substantial decrease in compressive strength.

In FIG. 3, the cell orientation in the x/z direction is decreased to between approximately 0.5 and about 0.97 while maintaining an anistropic ratio of between about 1.6 to about 1.03. Materials 20 made in accordance with FIG. 3 exhibit decreased thermal insulation R-value, increased thermal conductivity k, and increased aged thermal conductivity without an increase in the amount of polymeric material per unit measure. However, these materials 20 attain an increase in compressive strength.

The composition of the cell struts 26 and cell walls 28 of FIGS. 2 and 3 may be any such polymer materials suitable to make polymer foams. These include polyolefins, polyvinylchloride, polycarbonates, polyetherimides, polyamides, polyesters, polyvinylidene chloride, polymethylmethacrylate, polyurethanes, polyurea, phenol-formaldehyde, polyisocyanurates, phenolics, copolymers and terpolymers of the foregoing, thermoplastic polymer blends, rubber modified polymers, and the like. Also included are suitable polyolefins include polyethylene and polypropylene, and ethylene copolymers. Preferably, these thermoplastic polymers have weight-average molecular weights from about 30,000 to about 500,000.

A preferred thermoplastic polymer comprises an alkenyl aromatic polymer material. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer.

Suitable alkenyl aromatic polymers include those derived from alkenyl aromatic compounds such as styrene, alphamethylstyrene, paramethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{2-6}$ alkyl acids and esters, ionomeric derivatives, and $C_{4-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene.

Any suitable blowing agent may be used in the practice on this invention. Blowing agents useful in the practice of this invention include inorganic agents, organic blowing agents and chemical blowing agents. Suitable inorganic blowing agents include carbon dioxide, nitrogen, argon, water, air, nitrogen, and helium. Organic blowing agents include aliphatic hydrocarbons having 1-9 carbon atoms, aliphatic alcohols having 1-3 carbon atoms, and fully and partially halogenated aliphatic hydrocarbons having 1-4 carbon atoms. Aliphatic hydrocarbons include methane, ethane, propane, n-butane, isobutane, n-pentane, isopentane, and neopentane. Aliphatic alcohols include, methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, and perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124), and the like. Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, and N,N'-dimethyl-N,N'-dinitrosoterephthalamide and trihydrazino triazine. In the present invention it is preferable to use about 8 to about 14% by weight based on the weight of the polymer HCFC-142b or about 4 to about 12% of HFC-134a with 0 to 3% ethanol. Alternatively about 3 to about 8% carbon dioxide with 0 to about 4% lower alcohol, which include ethanol, methanol, propanol, isopropanol and butanol.

Optional additives which may be incorporated in the extruded foam product include additionally infrared attenuating agents, plasticizers, flame retardant chemicals, pigments, elastomers, extrusion aids, antioxidants, fillers, antistatic agents, UV absorbers, etc. These optional additives may be included in any amount to obtain desired characteristics of the foamable gel or resultant extruded foam products. Preferably, optional additives are added to the resin mixture but may be added in alternative ways to the extruded foam manufacture process.

Thus, for example, in the preferred embodiments having a structure as shown in FIGS. 2 and 3 above, the rigid foam plastic material 20 is formed from a plasticized resin mixture of polystyrene having a weight-average molecular weight of about 250,000, an infrared attenuation agent such as special asphalt, a blowing agent, and other process additives such as a nucleation agent, flame retardant chemicals, and a nano-gas barrier additive.

The rigid foam plastic material 20 of FIGS. 2 and 3 may be prepared by any means known in the art such as with an extruder, mixer, blender, or the like. The plasticized resin mixture, containing the thermoplastic polymer and preferably other additives, are heated to the melt mixing temperature and thoroughly mixed. The melt mixing temperature must be sufficient to plastify or melt the thermoplastic polymer. Therefore, the melt mixing temperature is at or above the glass transition temperature or melting point of the polymer. The melt mix temperature is from about 200 to 280° C., most preferably about 220 to about 240° C., depending on the amount of additives and the type of blowing agent used.

A blowing agent is then incorporated to form a foamable gel. The foamable gel is then cooled to a die melt temperature. The die melt temperature is typically cooler than the melt mix temperature, in the preferred embodiment, from about 100 to about 150° C., and most preferably from about 110 to about 120° C. The die pressure must be sufficient to prevent prefoaming of the foamable gel which contains the blowing agent. Prefoaming involves the undesirable premature foaming of the foamable gel before extrusion into a region of reduced pressure. Accordingly, the die pressure varies depending upon the identity and amount of blowing agent in the foamable gel. Preferably, in the preferred embodiment as shown in FIGS. 2 and 3, the pressure is from about 40 to about 70 bars, most preferably about 50 bars. The expansion ratio, foam thickness per die gap, is in the range of 20 to 70, typically about 60.

To make the materials 20 of FIG. 2 having a cell orientation ratio in the x/z direction of between about 1.03 about 2, the gap of the die lips and/or the shaper plates of the die are opened wider compared to those produced in the prior art as shown in FIG. 1. This produces materials 20 having greater than desired thickness. The line speed, or takeaway speed, of the conveyor is then used to pull down the materials 20 to the desired thickness. As described above, materials 20 made in accordance with FIG. 2 exhibit enhanced thermal insulation R-value, decreased thermal conductivity k, and decreased aged thermal conductivity without an increase in the amount of polymeric material per unit measure and without a substantial decrease in compressive strength as compared with substantially round celled materials 20 as in FIG. 1.

Conversely, for materials 20 having a cell orientation ratio in the x/z direction between about 0.97 to about 0.6, the gap of the die lips and/or shaper plates of the die are closed and the conveyor line speed is decreased as compared to the prior art as shown in FIG. 1 to cause the cells 22, 24 to grow in the z-direction. As described above, materials made in accordance with FIG. 3 have enhanced compressive strength without a substantial decrease in thermal insulation R-value as compared with substantially round celled materials 20 as in FIG. 1.

Of course, as those of skill in the art recognize, other factors used may influence the cell orientation ratio in the x/z direction. For example, it is more difficult to influence smaller cells 22, 24 than it is to effect larger cells 22, 24. Thus, blowing agents that produce smaller cell sizes, such as carbon dioxide, may be more difficult to influence than blowing agents that produce larger cell sizes, such as HCFC-142b.

In another preferred embodiment, an extruded polystyrene polymer foam similar to the foam material 20 of FIGS. 2 and 3 is prepared by twin-screw extruders (low shear) with flat die and plate shaper. A polystyrene pellet or bead is added into the extruder along with a nucleation agent, a fire retardant, and/or process agent by multi-feeders. Alternatively, a single screw tandem extruder (high shear) with radial die and a radial shaper may be used.

The polymeric foam material of the present invention comprises greater than about 95% closed cells and less than about 5% open cells. The foam material is a high strength, rigid insulation board with long term thermal performance and is water resistant. The polymeric foam material of the present invention is typically between about 0.50 to about 1.75 inches thick.

The polymeric foam material of the present invention meets the standard specifications according to *Standard Specification for Rigid, Cellular Polystyrene Thermal Insulation, Designation: C578-04a*, ASTM International, West Conshohocken, Pa., November, 2004, which is herein incorporated by reference in its entirety.

The polymeric foam material of the present invention has a maximum water absorption of less than about 0.10% by volume according to ASTM Test Method C 272. Preferably, the maximum water absorption of the foam is about 0.3% by volume. In the case of a 1.0 inch foam board, the foam material has a vapor permeance of 1.1 perm according to ASTM Test Method E 96. The polymeric foam material of the present invention has a flame spread of 5 according to ASTM Test Method E 84.

Applications of the present invention include placing the foam material under concrete slabs, over gravel fill that has been leveled and tamped. The foam material may be used in cavity walls, furred walls, and as sheathing material. The foam material is useful as exterior insulation wherein the foam board is placed on the exterior structure, i.e., a house, and siding is attached to the foam board. The foam material is also useful in residing applications and may be placed directly over old siding. New siding is then attached to the foam board.

Additionally, the foam material may be used in cold storage applications by installing the foam material under a concrete slab of an enclosure, in the sidewalls and on the roof of the enclosure. In typical cold storage applications, more than one layer of foam material is used according to the thermal requirements of the application.

The foam material may be used in agricultural applications, i.e., barns, on the sidewalls, under the concrete slab and under the roofing material of the barn. Additionally, the foam material may be used in roofing applications such as a roofing recovery board, below membrane roof insulation and in tapered roof applications.

The following are examples of the present invention suited to the preferred embodiment as shown in FIG. 2, and are not to be construed as limiting.

EXAMPLES

The invention is further illustrated by the following examples in which all foam boards were 1.5" in thickness, and all R-values were 180 day aged R-value, unless otherwise indicated. The aged R-value (aged 180 days) of the polymeric foam material is between about 5.0 to about 5.81° F.·ft$^2$·hr/BTU.

In the following examples and control examples, rigid polystyrene foam boards were prepared by a twin screw co-rotating extruder with a flat die and shaper plate. Vacuum was applied in the extrusion processes for some examples.

Table 1, shows a summary of the process conditions for the twin-screw extruder. The polystyrene resins used were 70% polystyrene having a melt index of 3 and the 30% polystyrene, having a melt index of 18.8 (both from Deltech, with molecular weight, Mw about 250,000). The composite melt index was around 10.8 in compound. Stabilized hexabromocyclododecane (Great Lakes Chemical, HBCD SP-75) was used as flame retardant agent in the amount of 1% by the weight of the solid foam polymer.

TABLE 1

| Key Operation Parameter | Examples |
|---|---|
| Wt. % of process additive | 0 to 6 |
| Wt. % of talc | 0-2 |
| Wt. % of HC | 0 to 3 |
| Wt. % of HFC 134a | 0 to 6 |
| Wt. % of HCFC-142b | 0-12 |
| Wt. % of $CO_2$ | 0-5 |
| Extruder Pressure, Kpa (psi) | 13000-17000 (1950-2400) |
| Die Melt Temperature, ° C. | 117-123 |
| Die Pressure, Kpa (psi) | 5400-6600 (790-950) |
| Line Speed, m/hr (ft/min) | 110-170 (6-9.5) |
| Throughput, kg/hr | 100-200 |
| Die Gap, mm | 0.4-1.8 |
| Vacuum KPa (inch Hg) | 0-.4.25 (0 to 20) |

The results of above examples, and a comparative example of the convention process with round cell structure shown in Table 2.

TABLE 2

| Run # | Aged R-value 180 days K·m$^2$/W (F·ft$^2$·hr/Btu) | Density Kg/m3 (pcf) | Cell Anisotropic Ratio | Average Cell micron | Cell Orientation x/z | Vacuum Hg inch | Blowing Agent |
|---|---|---|---|---|---|---|---|
| 428-2 | 1.023 (5.81) | 32.48 (2.03) | 0.856 | 272 | 1.36 | 6 | 1 |
| 431-3 | 0.997 (5.66) | 32 (2) | 0.911 | 257 | 1.22 | 6.6 | 1 |
| 443-2 | 0.97 (5.51) | 27.52 (1.72) | 0.888 | 273 | 1.3 | 12 | 1 |
| 445-2 | 0.912 (5.18) | 27.36 (1.71) | 0.989 | 250 | 1.08 | 13.5 | 1 |
| 448-5 | 0.965 (5.48) | 24.32 (1.52) | 0.901 | 260 | 1.26 | 16.4 | 1 |
| 459-2 | 0.912 (5.13) | 23.36 (1.46) | 0.977 | 256 | 1.02 | 14 | 1 |
| 509-8 | 0.895 (5.08) | 28.8 (1.8) | 0.888 | 252 | 1.21 | 12.6 | 2 |
| 498-2 | 0.852 (4.83) | 28.18 (1.76) | 0.982 | 177 | 1.06 | 13 | 2 |
| 191-2 | 0.743 (4.22) | 50.56 (3.16) | 1.095 | 279 | 0.79 | No | 3 |
| 183-4 | 0.696 (3.95) | 49.76 (3.11) | 1.215 | 224 | 0.6 | No | 3 |

\* where, aged R-value is 40 days for carbon dioxide samples;
\*\* Blowing agent 1: HCFC 142 b 11 wt %; 2: HFC 134a 5.5 wt % and ethanol 3 wt %; 3: carbon dioxide 3.68 wt % and ethanol 1.4 wt %
\*\*\* All specimens are 38 to 42 mm (around 1.5") in thickness More completed data treatments of these trials are shown on FIG. 4 is a graphical illustration from 52 trials showing the thermal insulation R-value vs. cell orientation of rigid foam board with several density levels, over a period of 180 days, HCFC 142 b blowing agent, 10.5 to 11.5 weight percentage of total solid was used, which shows an R-value increase of 6 to 12% by changing cell orientation from 0.9 to 1.3 for a foam board with 1.6 pcf density.

Figure 5:
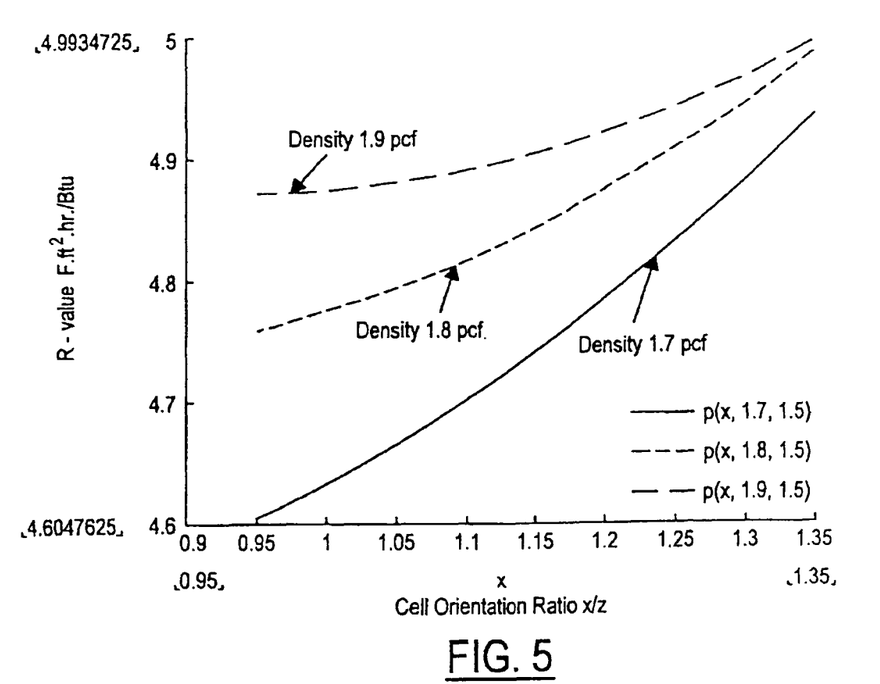
FIG. 5 is a graph, showing test results from 39 trials, related to R-value vs. cell orientation of polystyrene foam boards with several density levels, over a period of 180 days, HFC134a, about 5.5 wt %, and ethanol, about 3 wt %, were used as blowing agent for foaming these boards.

FIG. 5 is a graph, showing test results from 39 trials, related to R-value vs. cell orientation of polystyrene foam boards with several density levels, over a period of 180 days, HFC134a 5.5 wt % and ethanol 3 wt % were used as blowing agent for foaming these boards, which shows an R-value increase of 5 to 10% by changing cell orientation from 0.9 to 1.3 for a foam board with 1.6 pcf density.

Figure 6:
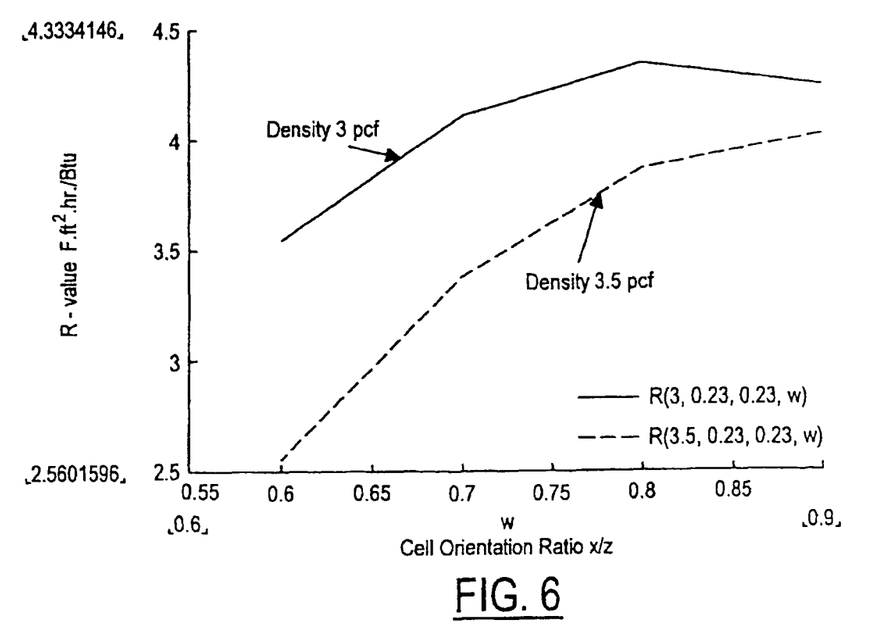
FIG. 6 is a graph, showing test results from 32 trials, related to R-value vs. the cell orientation ratio of polystyrene foam boards with several density levels, over a period of 40 days at equilibrium of gas diffusion, carbon dioxide, about 3.68 wt % and ethanol, about 1.4 wt % were used as blowing agent.

FIG. 6 is a graph, showing test results from 32 trials, related to R-value vs. the cell orientation of polystyrene foam boards with several density levels, over a period of 40 days at equilibrium of gas diffusion, carbon dioxide 3.68 wt % and ethanol 1.4 wt % were used as blowing agent, which shows an R-value increase of 4 to 8% by changing cell orientation from 0.7 to 0.9 for a foam board with 3 pcf density.

Figure 4:
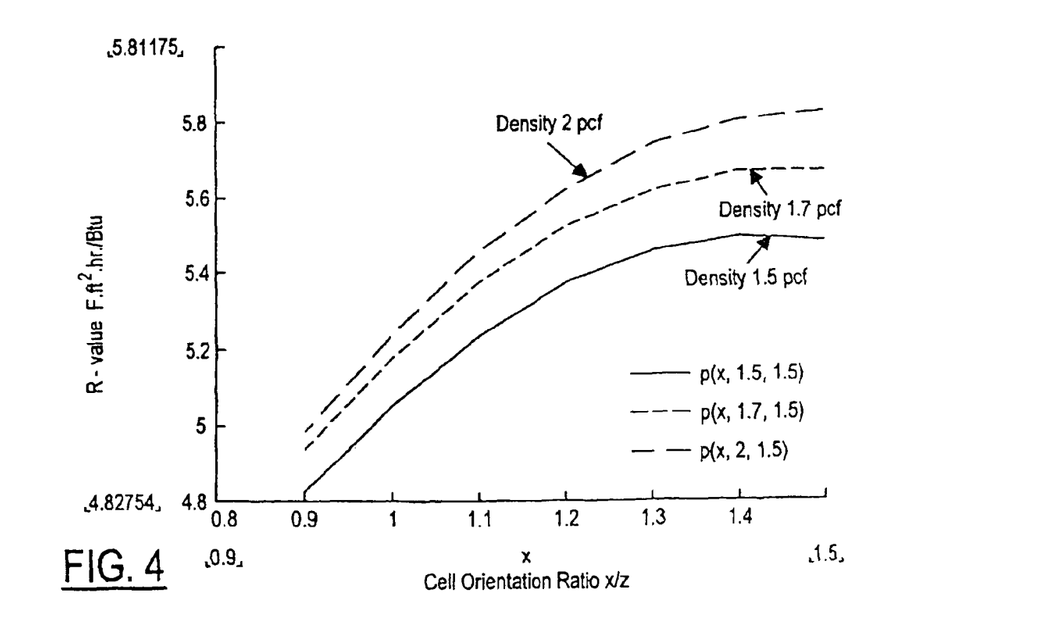
FIG. 4 is a graphical illustration from 52 trials showing the thermal insulation R-value vs. cell orientation ratio (x/z) of rigid foam board with several density levels, over a period of 180 days, HCFC 142 b blowing agent, about 10.5 to bout 11.5 weight percentage of total solid was used.

Based on the test data from all these trials from a multivariable regression calculation yields the R-value vs. Cell Orientation (or Cell Anisotropic Ratio) as shown in FIGS. 4, 5 and 6, which shows an R-value increase of 3 to 12% by increase cell orientation 0.1 to 0.3 in comparison with projected R-values of same cell structure, without cell morphology change polymer foams with different foam densities.

While the invention has been described in terms of preferred embodiments, it will be understood, of course, that the invention is not limited thereto since modifications may be made by those skilled in the art, particularly in light of the foregoing teachings.

What is claimed is:

1. A method of increasing the cell orientation ratio in the x/z direction of a rigid polymer foam material comprising:
   providing a device capable of producing a rigid polymer foam material;
   introducing a thermoplastic polymer resin to said device;
   heating said thermoplastic polymer resin above its glass transition temperature and melting point;
   incorporating one or more blowing agents into said thermoplastic polymer resin at a first pressure to form a gel, said first pressure being sufficient to prevent pre-foaming of said gel;
   cooling said gel to a die melt temperature; and
   extruding the gel through a die gap of the device to a region of lower die pressure;
   wherein said gel is extruded through said die gap onto a conveyor such that the gel grows quicker in the x-direction relative to the z-direction to form the polymer foam material, wherein said x-direction is defined as the extruded direction of the polymer foam material and wherein said z-direction is defined as the vertical thickness direction of the polymer foam material
   wherein the polymeric foam material comprises greater than about 95% closed cells.

2. The process of claim 1, wherein said device comprises an extruder, a mixer or a blender.

3. The process of claim 1, wherein the gel grows quicker in the x-direction relative to the z-direction by increasing the line pulling speed of the device through said die gap at a constant die gap thickness while maintaining a constant foam density of the polymeric foam material.

4. The process of claim 1, wherein introducing a thermoplastic polymer material to said device comprises introducing an alkenyl aromatic polymer to said device.

5. The process of claim 1, wherein incorporating one or more blowing agents comprises incorporating one or more blowing agents into said thermoplastic polymer resin at a first pressure to form a gel, said first pressure sufficient to prevent pre-foaming of said gel, said one or more blowing agents comprising partially or fully hydrogenated HCFC's, HFC's, HC's, carbon dioxide, other inert gases, and mixtures thereof.

6. The process of claim 1, wherein introducing a thermoplastic polymer resin to said device comprises introducing a thermoplastic polymer resin to said device, said thermoplastic polymer resin having a weight average molecular weight of between about 30,000 to about 500,000.

7. The method of claim 1, wherein the cell orientation ratio in the x/z direction of the rigid polymer foam materials is between about 1.03 to about 2.0.

8. The process of claim 1, wherein said method produces an insulating board suitable for use in building construction.

9. The process of claim 1, wherein the cooling step further comprises cooling said gel from about 220 degrees C. to about 110 degrees C.

10. The process of claim 1, wherein the first pressure is about 50 bars.

11. The method of claim 1, wherein said polymeric foam material comprises from about 95% to 99.94% closed cells.

12. The method of claim 1, wherein said polymeric foam material has an R-value of between about 5.0 and about 5.81° F.·ft²·hr/BTU.

13. The method of claim 1, wherein said one or more blowing agents comprises an organic blowing agent selected from the group consisting of aliphatic hydrocarbons having from 1 to 9 carbon atoms, aliphatic alcohols having from 1 to 3 carbon atoms and fully or partially halogenated aliphatic hydrocarbons having from 1 to 4 carbon atoms.

14. A method of improving the material properties of a rigid polymeric foam board suitable for use in building construction, comprising the steps of:
   heating a thermoplastic polymer resin above its glass transition temperature and melting point;
   incorporating one or more blowing agents into said thermoplastic polymer resin at a first pressure to form a gel, said first pressure sufficient to prevent pre-foaming of said gel;
   cooling said gel to a die melt temperature;
   extruding the gel into a region of lower pressure through a die gap onto a conveyor;
   pre-selecting the size of the die gap and the line speed of the conveyor, thereby controlling the rate at which the gel grows in the x-direction relative to the rate at which the gel grows in the z-direction,
   wherein said x-direction is defined as the extruded direction of the rigid polymeric foam board and wherein said z-direction is defined as the vertical thickness direction of the rigid polymeric foam board, and
   wherein the rigid polymeric foam board comprises greater than about 95% closed cells.

15. The method of claim 14, wherein the pre-selecting step further comprises pre-selecting the size of the die gap and the line speed of the conveyor such that the gel grows quicker in the x-direction relative to the z-direction, thereby decreasing the thermal conductivity of the rigid polymeric foam board produced thereby.

16. The method of claim 14, wherein the selecting step further comprises pre-selecting the size of the die gap and the line speed of the conveyor such that the gel grows slower in the x-direction relative to the z-direction, thereby increasing the compressive strength of the rigid polymeric foam board produced thereby.

17. The method of claim 16, wherein the cell orientation ratio in the x/z direction of the rigid polymeric foam board is between about 0.5 to about 0.97.

18. The method of claim 14, wherein said rigid polymeric foam board comprises from about 95% to 99.94% closed cells.

19. The method of claim 14, wherein said polymeric foam board has an R-value of between about 5.0 and about 5.81° $F. \cdot ft^2 \cdot hr/BTU$.

20. The method of claim 14, wherein said one or more blowing agents comprises an organic blowing agent selected from the group consisting of aliphatic hydrocarbons having from 1 to 9 carbon atoms, aliphatic alcohols having from 1 to 3 carbon atoms and fully or partially halogenated aliphatic hydrocarbons having from 1 to 4 carbon atoms.

* * * * *